US008514751B2

(12) United States Patent
Choi et al.

(10) Patent No.: US 8,514,751 B2
(45) Date of Patent: Aug. 20, 2013

(54) APPARATUS AND METHOD FOR SIMULTANEOUS TRANSMISSION SCHEDULING IN A MULTI-HOP CELLULAR SYSTEM

(75) Inventors: Jin-Ghoo Choi, Seoul (KR); Sang-Boh Yun, Seongnam-si (KR); Chi-Hyun Park, Suwon-si (KR); Chung-Ha Koh, Seoul (KR); Young-Yong Kim, Seoul (KR); Kyung-Ho Sohn, Seoul (KR)

(73) Assignees: Samsung Electronics Co., Ltd., Suwon-si (KR); Korea and Industry-Academic Cooperation Foundation, Seoul (KR)

( * ) Notice: Subject to any disclaimer, the term of this patent is extended or adjusted under 35 U.S.C. 154(b) by 1484 days.

(21) Appl. No.: 12/080,651

(22) Filed: Apr. 3, 2008

(65) Prior Publication Data
US 2010/0322139 A1 Dec. 23, 2010

(30) Foreign Application Priority Data
Apr. 3, 2007 (KR) ........................ 10-2007-0032977

(51) Int. Cl.
*H04B 7/005* (2006.01)
*H04J 1/10* (2006.01)

(52) U.S. Cl.
USPC .......................................... 370/278; 370/315

(58) Field of Classification Search
USPC .................... 370/254, 278, 315; 455/9, 11.1, 455/422.1
See application file for complete search history.

(56) References Cited

U.S. PATENT DOCUMENTS

| | | | |
|---|---|---|---|
| 2004/0106431 A1* | 6/2004 | Laroia et al. | 455/552.1 |
| 2004/0114567 A1* | 6/2004 | Kubler et al. | 370/349 |
| 2004/0192204 A1* | 9/2004 | Periyalwar et al. | 455/25 |
| 2006/0077906 A1* | 4/2006 | Maegawa et al. | 370/254 |
| 2007/0087691 A1* | 4/2007 | Lee et al. | 455/13.2 |
| 2007/0195723 A1* | 8/2007 | Attar et al. | 370/318 |
| 2007/0270113 A1* | 11/2007 | Oh et al. | 455/185.1 |
| 2007/0274336 A1* | 11/2007 | Binder | 370/463 |
| 2008/0070582 A1* | 3/2008 | Cai | 455/450 |
| 2008/0075029 A1* | 3/2008 | Song | 370/311 |
| 2008/0107091 A1* | 5/2008 | Ramachandran | 370/338 |
| 2008/0108312 A1* | 5/2008 | Viorel et al. | 455/78 |
| 2008/0144512 A1* | 6/2008 | Molisch et al. | 370/238 |
| 2008/0219214 A1* | 9/2008 | Chen et al. | 370/331 |
| 2008/0267110 A1* | 10/2008 | Cai et al. | 370/315 |

FOREIGN PATENT DOCUMENTS

| | | |
|---|---|---|
| KR | 10-2005-0116957 | 12/2005 |
| KR | 10-2007-0117140 | 12/2007 |

* cited by examiner

*Primary Examiner* — Dang Ton
*Assistant Examiner* — Ryan Kavleski

(57) ABSTRACT

An apparatus and method for simultaneous transmission scheduling in a multi-hop cellular system are provided, in which a base station presets simultaneous transmission relay station set information and transmits the simultaneous transmission relay station set information to relay stations managed by the base station, and an relay station receives the simultaneous transmission relay station set information from the base station, determines, upon receipt of a data frame from the base station, a state of the relay station preset in relation to a receiving relay station for the data frame by comparing an ID of the receiving relay station included in the data frame with the simultaneous transmission relay station set information, and operates according to the preset state.

20 Claims, 8 Drawing Sheets

APPARATUS AND METHOD FOR SIMULTANEOUS TRANSMISSION SCHEDULING IN A MULTI-HOP CELLULAR SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Apr. 3, 2007 and assigned Serial No. 2007-32977, the entire disclosure of which is hereby incorporated by reference.

TECHNICAL FIELD OF THE INVENTION

The present invention generally relates to an apparatus and method for simultaneous transmission scheduling in a multi-hop cellular system. More particularly, the present invention relates to a simultaneous transmission scheduling apparatus and method in a multi-hop cellular system, in which when a base station (BS) transmits data to a relay station (RS), other relay stations within the service area of the base station operate in states preset in relation to the receiving relay station and a relay station preset to a shut-down state among these relay stations estimates the states of its neighbor relay stations and transmits data according to the estimated states.

BACKGROUND OF THE INVENTION

Today, more and more people carry portable electronic devices including laptop computers, hand-held phones, Personal Digital Assistants (PDAs), and Moving Picture Experts Group Audio-Layer 3 (MP3) players. Most of these devices operate independently. If portable electronic devices form a wireless network in a self-configurable fashion without the aid of a central control system, they can easily share a variety of pieces of information and thus provide new diverse information communication services to their users. Such a wireless network that enables communications between portable electronic devices without assistance of the central control system anywhere at any time is called an ad hoc network or a ubiquitous network. The ad hoc network was developed first for military purposes in the 1970's and then found its applications in battlefields or emergency/disaster situations.

Providing services with diverse Quality of Service (QoS) requirements to users at high data rates is an active study area for a future-generation communication system called 4th Generation (4G). To enable high-speed communications and to accommodate an increasing number of calls, the 4G communication system requires cells with very small radiuses. In this context, a multi-hop relay network has attracted much interest in that it can expand cell coverage and increase system capacity by use of a multi-hop relay scheme. The cellular network establishes a multi-hop relay path between a base station (BS) and a mobile station (MS) via relay stations, if the channel status between the BS and the MS is poor, thereby providing a better channel to the MS. Consequently, the use of multi-hop relaying provides communication services more efficiently in a shadowing area experiencing severe shielding effects due to buildings or other obstacles. Also, a high-speed data channel can be provided at a cell boundary where mobile stations are placed in poor channel status, thus expanding cell coverage.

FIG. 1 illustrates the configuration of a multi-hop cellular system. Referring to FIG. 1, the multi-hop cellular system includes a BS 100, relay stations 110 and 120 managed by the BS 100, and mobile stations 112, 114, 122, 124 and 126.

Because the single BS 100 manages and communicates with the plurality of relay stations 110 and 120, when it transmits data to one RS, for example, the RS 110, the data transmission interferes with the neighbor RS 120. That is, wireless relay stations interfere with one another during transmission and reception in the multi-hop cellular system. A major technique for minimizing the interference and increasing throughput is centralized scheduling.

In the centralized scheduling scheme, the products of a capacity and a queue length is computed for every simultaneous transmission link set and a simultaneous transmission link set having the highest product is selected. In other words, a link set with the largest capacity and the longest queue is chosen by searching all possible simultaneous transmission link sets. For more details of the centralized scheduling scheme, see Viswanathan, H. and Mukherjee, S., "Performance of Cellular Networks with Relays and Centralized Scheduling", Wireless Communications, IEEE Transactions on September 2005.

A shortcoming with the centralized scheduling scheme is, however, that complexity increases exponentially with the number of mobile stations or relay stations and the need for the queue lengths of the relay stations in the BS requires additional signaling. Moreover, it is impossible for the BS to acquire the Signal-to-Interference and Noise Ratio (SINR) of each link required for capacity computation and the BS should notify relay stations included in a selected simultaneous transmission link set that they are selected for data transmission, causing a time delay.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide an apparatus and method for simultaneous transmission scheduling in a multi-hop cellular system.

Another aspect of exemplary embodiments of the present invention provides a simultaneous transmission scheduling apparatus and method for maximizing utilization of a link, while avoiding interference between relay stations in a multi-hop cellular system.

A further aspect of exemplary embodiments of the present invention provides a simultaneous transmission scheduling apparatus and method in a multi-hop cellular system, in which in relation to each receiving RS, the states of its neighbor relay stations are preset and stored, and when a BS transmits data to an RS, each RS identifies the receiving RS, checks its state based on the preset information, and operates according to the state.

Still another aspect of exemplary embodiments of the present invention provides a simultaneous transmission scheduling apparatus and method in a multi-hop cellular system, in which an RS preset to a shut-down state estimates the states of its neighbor relay stations, checks the presence or absence of interference regarding the states of the neighbor base stations, and determines whether to transmit data according to the interference check result.

In accordance with an aspect of exemplary embodiments of the present invention, there is provided a multi-hop cellular system for simultaneous transmission scheduling, in which a BS presets simultaneous transmission RS set information and transmits the simultaneous transmission RS set information to relay stations managed by the BS, and an RS receives the simultaneous transmission RS set information from the BS, determines, upon receipt of a data frame from the BS, a state of the RS preset in relation to a receiving RS for the data frame by comparing an ID of the receiving RS included in the data frame with the simultaneous transmission RS set information, and operates according to the preset state.

In accordance with another aspect of exemplary embodiments of the present invention, there is provided an RS in a multi-hop cellular system that performs simultaneous transmission scheduling, in which a communication module receives a data frame from a BS, a memory stores preset simultaneous transmission RS set information and preset neighbor RS information, and a scheduler determines, upon receipt of a data frame from the BS, a state of the RS preset in relation to a receiving RS for the data frame by comparing an ID of the receiving RS included in the data frame with the simultaneous transmission RS set information, and controls the RS to operate according to the preset state.

In accordance with a further aspect of exemplary embodiments of the present invention, there is provided a simultaneous transmission scheduling method of an RS in a multi-hop cellular system, in which preset simultaneous transmission RS set information indicating sets of relay stations capable of simultaneous transmission is stored, information about a receiving RS included in a data frame is detected upon receipt of a data frame from a BS, a state of the RS preset in relation to the receiving RS is determined by comparing the receiving RS information with the simultaneous transmission RS set information, and an operation is performed according to the preset state.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a simultaneous transmission scheduling apparatus and method in a multi-hop cellular system, in which in relation to each receiving RS, the states of its neighbor relay stations are preset and stored, and when a BS transmits data to an RS, each RS identifies the receiving RS, checks its state based on the preset information, and operates according to the state.

Figure 1:
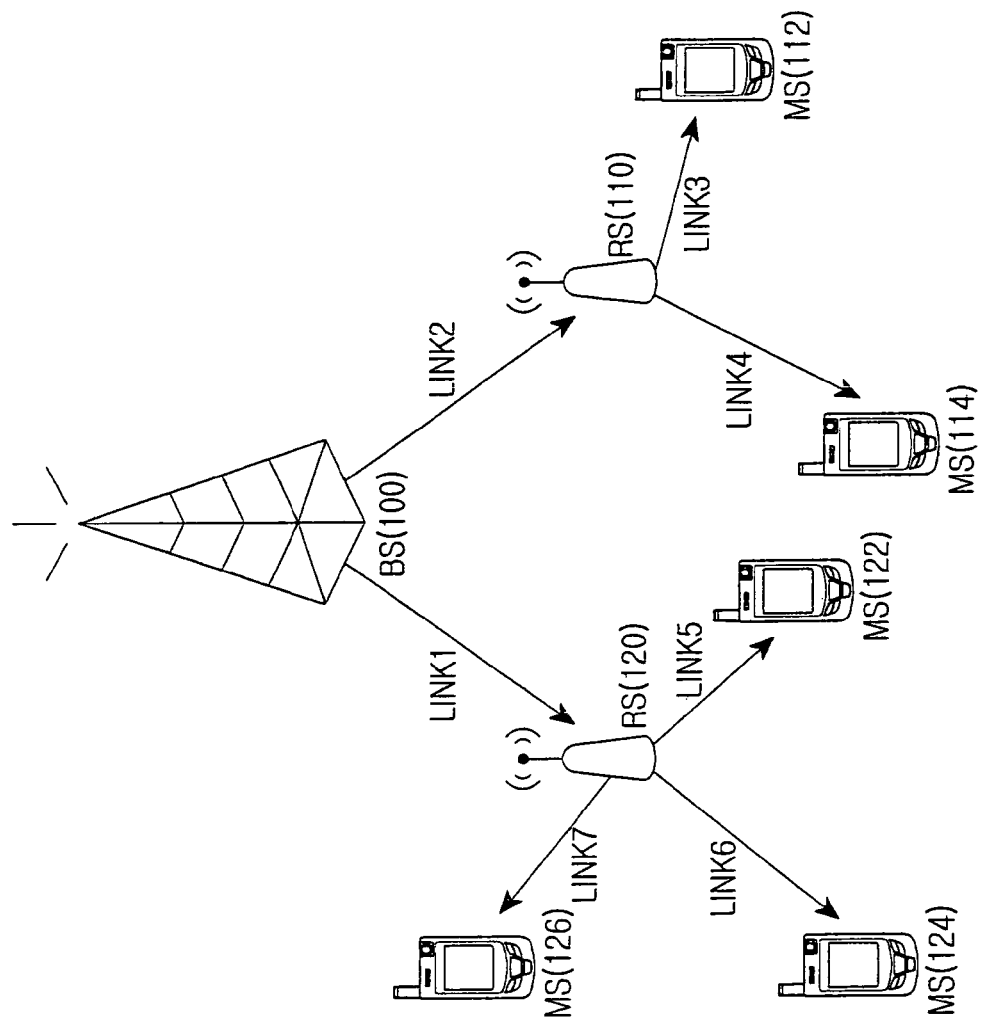
FIG. 1 illustrates the configuration of a multi-hop cellular system.
Figure 2:
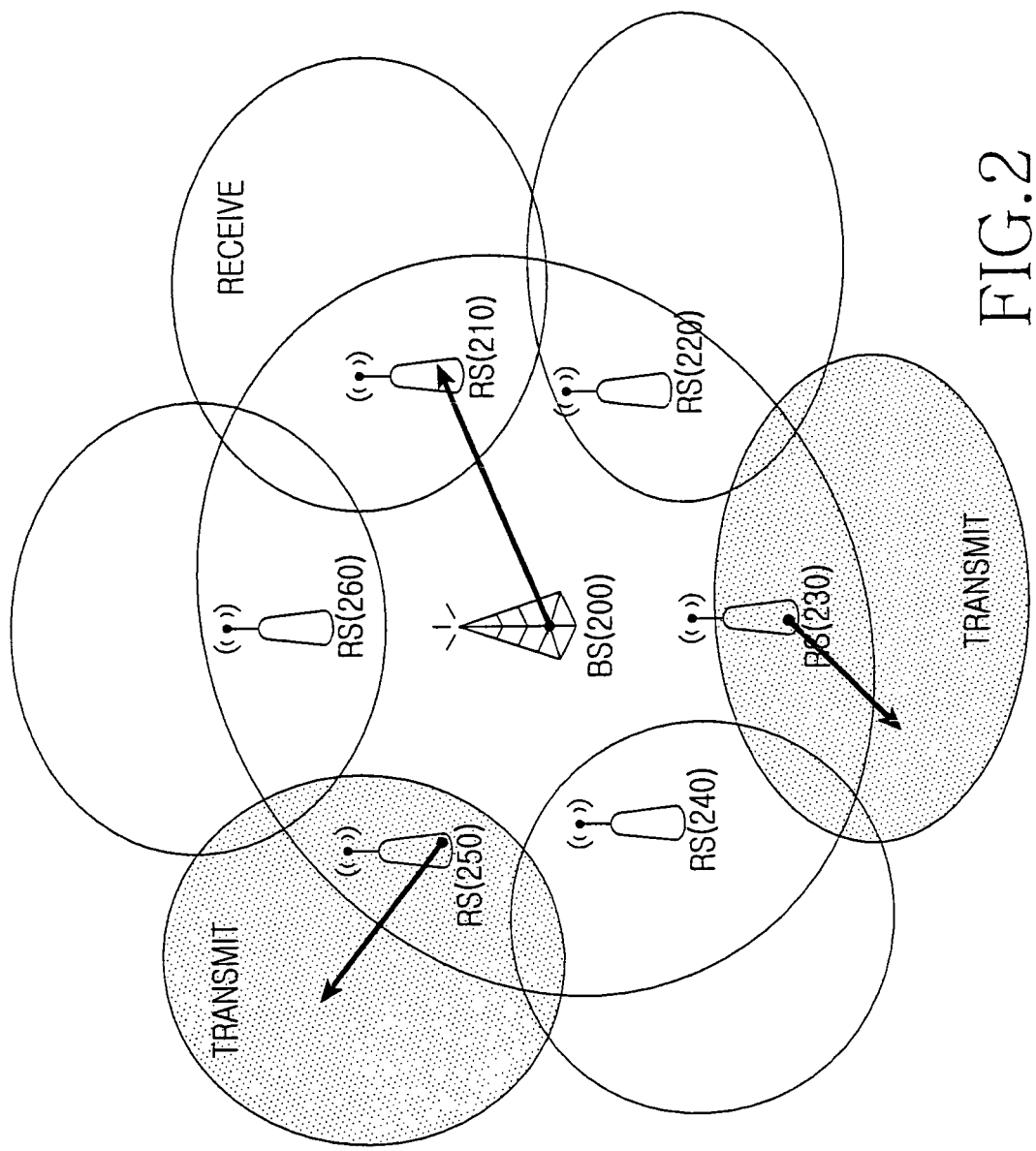
FIG. 2 illustrates the configuration of a multi-hop cellular system according to an exemplary embodiment of the present invention.

FIG. 2 illustrates the configuration of a multi-hop cellular system according to an exemplary embodiment of the present invention. Referring to FIG. 2, a BS 200 includes a plurality of relay stations 210 to 260 in the multi-hop cellular system. In accordance with the present invention, the multi-hop cellular system detects relay stations capable of simultaneous transmission without interference in relation to each receiving RS and presets the states of the relay stations and other relay stations with respect to the receiving RS. For instance, if the RS 210 is a receiving RS, i.e. it is placed in receive state, the relay stations 230 and 250 that do not interfere with the RS 210 are preset to transmit state and the other relay stations 220, 240 and 260 are preset to shut-down state since they can interfere the receive-state RS 210 or the transmit-state relay stations 230 and 250.

Hereinafter, preset receive, transmit and shut-down states are denoted by R, T and S, respectively. In the mean time, an RS may operate actually in a different state from its preset state. In contrast to the preset states, actual transmit, receive and shut-down states are denoted by r, t, and s, respectively.

Accordingly, possible combinations of the preset states and the actual states are (R, r), (T, t), (T, s), (S, s) and (S, t). (R, r) means that an RS is preset to receive state and actually receives data. (T, s) implies that although an RS is preset to transmit state, it does not transmit data due to the absence of transmission data and thus is actually placed in shut-down state. (S, t) means that an RS preset to shut-down state actually transmits data only if it has transmission data and causes no interference to its neighbor relay stations.

Figure 3:
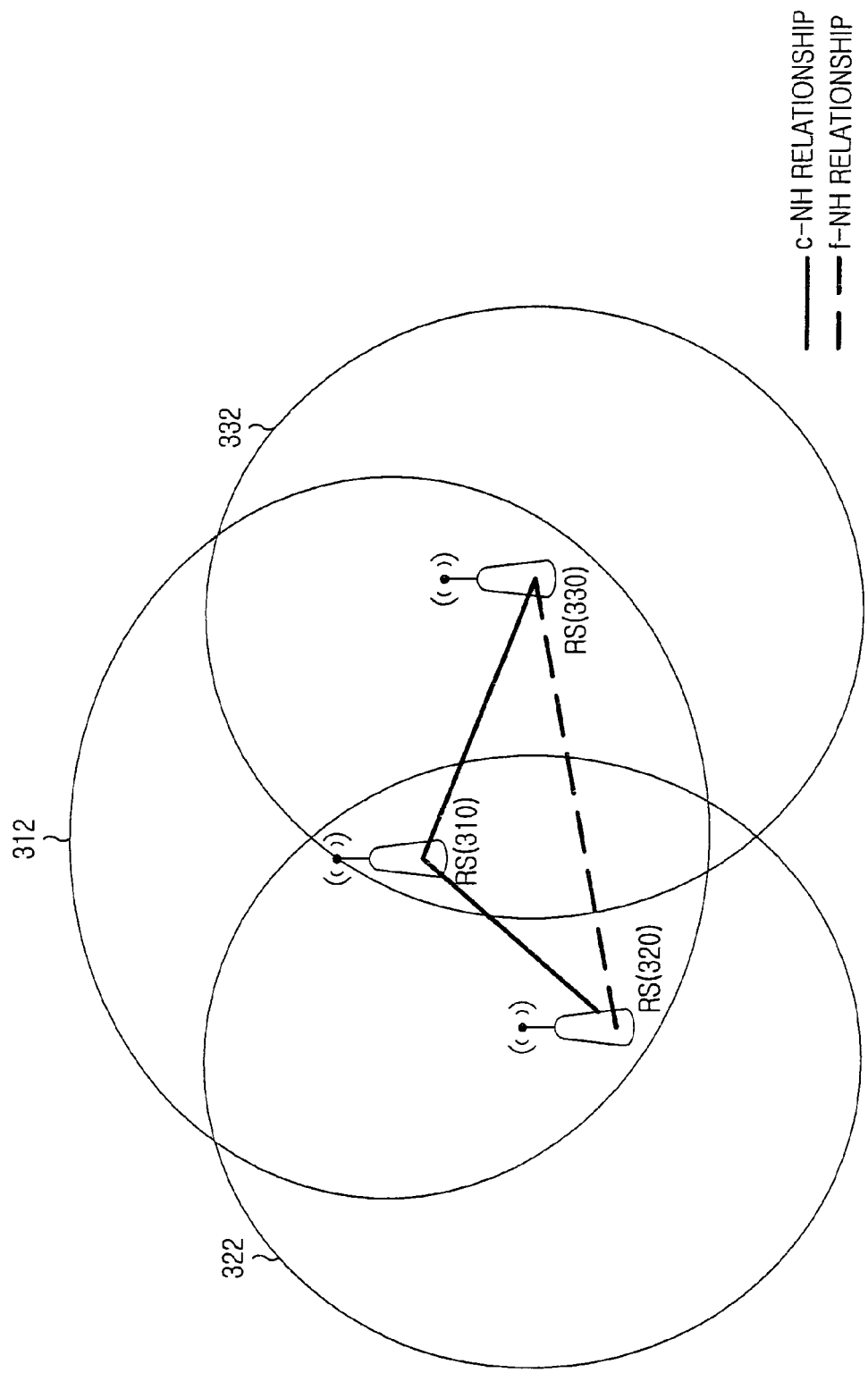
FIG. 3 illustrates relationships among neighbor relay stations in the multi-hop cellular system according to an exemplary embodiment of the present invention.

Now a description will be made of relationships among relay stations in the multi-hop cellular system with reference to FIG. 3. FIG. 3 illustrates relationships among neighbor relay stations in the multi-hop cellular system according to an exemplary embodiment of the present invention.

In accordance with the present invention, neighbor relay stations can be placed by and large in two types of relationships, close-NeighborHood (c-NH) and far-NeighborHood (f-NH). When a neighbor RS is within the cell area of an RS, the neighbor RS is a c-NH of the RS, whereas when the neighbor RS is not within the cell area of the RS and the cell areas of the RS and the neighbor RS are overlapped, the neighbor RS is an f-NH of the RS.

Referring to FIG. 3, as relay stations 320 and 330 are located within the cell area 312 of an RS 310, the RS 310 is in the c-NH relationship with the relay stations 320 and 330. The RS 320 and the RS 330 are in the f-NH relationship in that they each do not have the other RS in their cell areas 322 and 332 and their cell areas 322 and 332 are overlapped.

Figure 4:
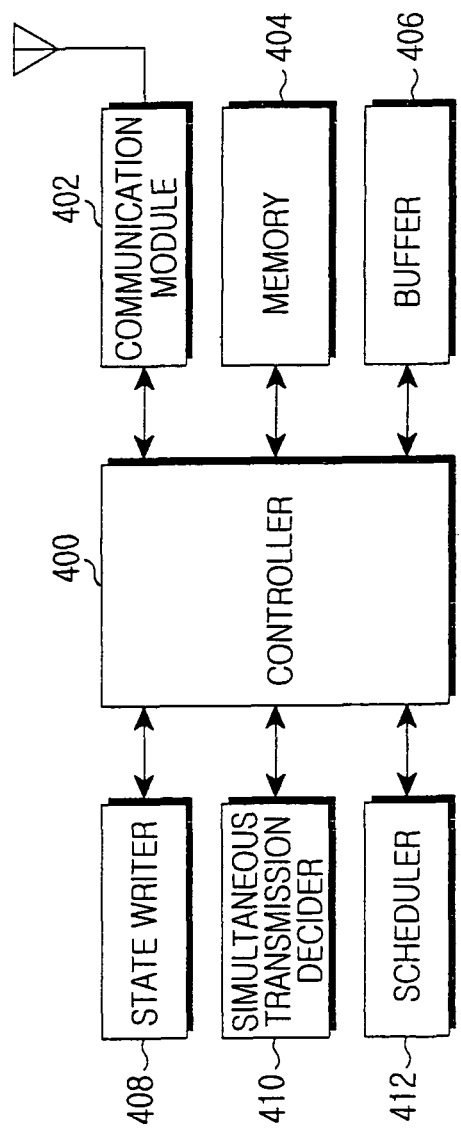
FIG. 4 is a block diagram of an RS capable of simultaneous transmission scheduling in the multi-hop cellular system according to an exemplary embodiment of the present invention.

An RS that estimates its neighbor relay stations and performs simultaneous transmission scheduling will be described below with reference to FIG. 4. FIG. 4 is a block diagram of an RS capable of simultaneous transmission scheduling in the multi-hop cellular system according to an exemplary embodiment of the present invention.

Referring to FIG. 4, the RS includes a controller 400, a communication module 402, a memory 404, a buffer 406, a state writer 408, a simultaneous transmission decider 410, and a scheduler 412.

The communication module 402, which includes a transmission Modulator-Demodulator (MODEM) and a reception MODEM, transmits and receives data frames to and from a BS and an MS to relay communications between them. The transmission MODEM may include a channel encoding block, a modulation block, and a Radio Frequency (RF) transmission block. The channel encoding block may have a channel encoder, an interleaver, and a modulator. The modulation block may be configured to include an Inverse Fast Fourier Transform (IFFT) processor for mapping transmission data to a plurality of orthogonal subcarriers. The RF transmission block may include a filter and an RF end front unit. The reception MODEM may include an RF reception block, a demodulation block, and a channel decoding block. The RF reception block may be configured to have a filter and an RF front end unit and the demodulation block may include a Fast Fourier Transform (FFT) processor. The channel decoding block may have a demodulator, a deinterleaver, and a channel decoder.

The memory 404 stores programs for controlling the overall operation of the RS, application programs, and data to be kept. Also, the memory 404 stores a c-NH RS list, an f-NH RS list, information about simultaneous transmission RS sets with respect to R-state relay stations (referred to as simultaneous transmission RS set information), information about the states of c-NH relay stations (referred to as c-NH RS state information), and information about the states of f-NH relay stations (referred to as f-NH RS state information) according to the present invention.

The c-NH RS state information indicates the amounts of received data and transmitted data of the C-NH relay stations, and the f-NH RS state information provides information about states preset for the f-NH relay stations in relation to R-state relay stations that can be identified when data frames are received. The simultaneous transmission RS set information is set by and received from the BS at an early state of communications. For each RS, the BS determines c-NH relay stations and f-NH relay stations. When the RS is set to state R, the BS sets the c-NH relay stations of the RS to state S and the f-NH relay stations of the RS to state T. If the RS is set to state T, the BS sets both the c-NH relay stations and the f-NH relay stations to state S. In this manner, the BS forms the simultaneous transmission RS set information.

The buffer 406 temporarily stores data transmitted from the RS. The state writer 408 checks the c-NH RS state information and the f-NH RS state information and controls the memory 404 to store them.

If the RS is preset to state S as judged by the scheduler 412, the simultaneous transmission decider 410 checks the preset states of neighbor relay stations and determines whether interference can occur if the RS actually transmits data. If the RS can transmit data without interference, the simultaneous transmission decider 410 controls data to be transmitted. The operation of the simultaneous transmission decider 410 will be described later in more detail with reference to FIG. 6.

Upon receipt of a data frame from the BS, the scheduler 412 identifies an RS for which the data frame is intended (i.e. an R-state RS) and checks the preset state of the RS in relation to the R-state RS based on the simultaneous transmission RS set information. If the RS is preset to state R, the scheduler 412 controls the RS to receive data from the BS. If the RS is preset to state T, the scheduler 412 determines whether the buffer 406 has transmission data and controls the RS to transmit data in the presence of transmission data. In the absence of transmission data, the RS transitions to state s. If the RS is preset to state S, the scheduler 412 determines whether simultaneous transmission is available through the simultaneous transmission decider 410. If simultaneous transmission is available, the scheduler 412 transitions the RS to state t and controls the RS to transmit data. Meanwhile, the scheduler 412 can identify the R-state RS from a preamble signal of the data frame received from the BS.

The controller 400 controls the state writer 408, the simultaneous transmission decider 410, and the scheduler 412. The controller 400 can carry out the functionalities of the state writer 408, the simultaneous transmission decider 410, and the scheduler 412. Hence, while they are separately configured herein for illustrative purposes, all or part of the state writer 408, the simultaneous transmission decider 410, and the scheduler 412 can be incorporated into the controller 400 in real implementation.

A simultaneous transmission scheduling method for maximizing utilization of links, while avoiding inter-RS interference in the multi-hop cellular system according to the present invention will be described below.

Figure 5:
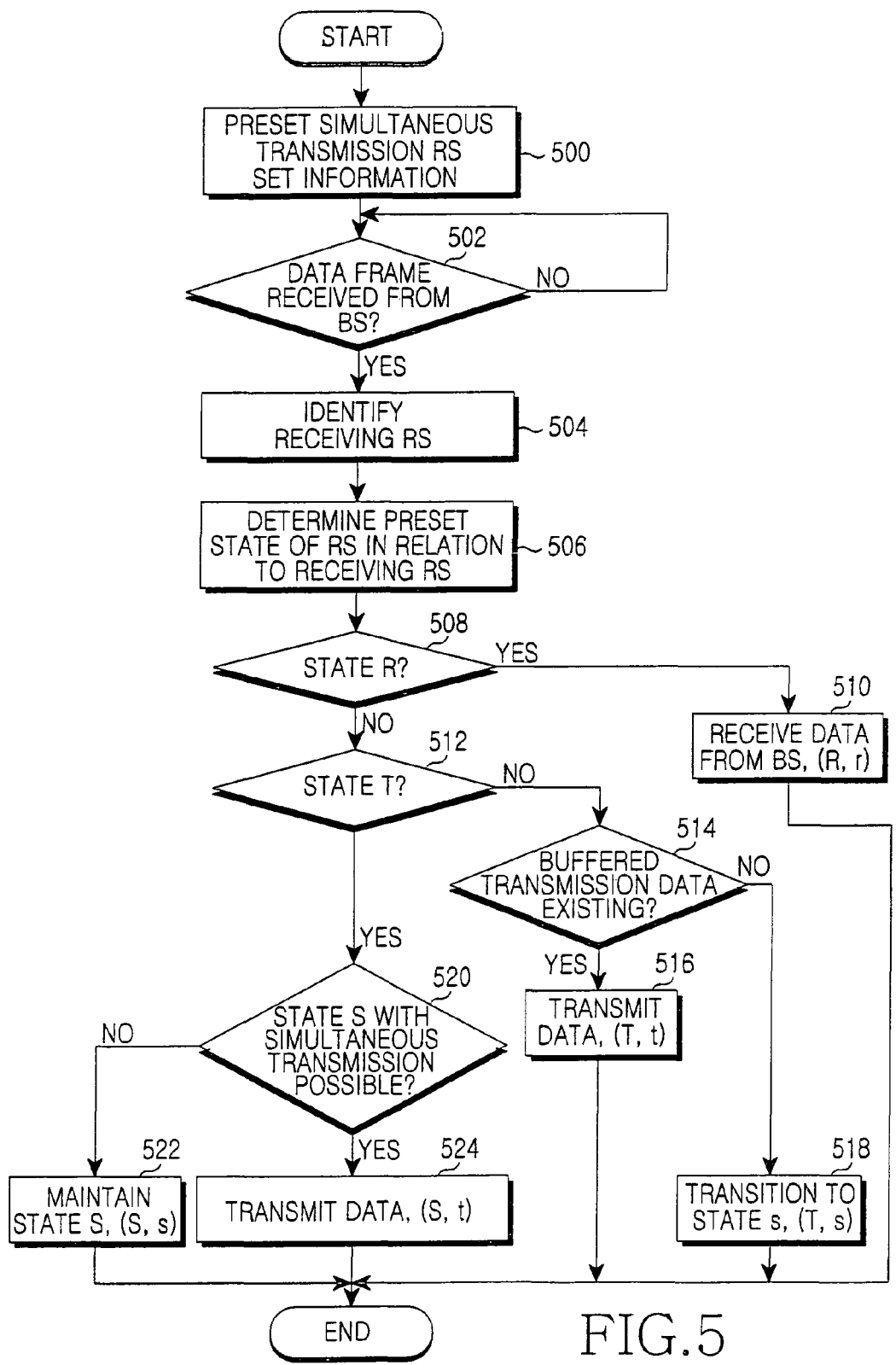
FIG. 5 is a flowchart illustrating a simultaneous transmission scheduling operation of the RS in the multi-hop cellular system according to an exemplary embodiment of the present invention.

FIG. 5 is a flowchart illustrating a simultaneous transmission scheduling operation of the RS in the multi-hop cellular system according to an exemplary embodiment of the present invention.

Referring to FIG. 5, the RS receives simultaneous transmission RS set information from the BS and stores it in step 500. Upon receipt of a data frame from the BS in step 502, the RS identifies an R-state RS from the data frame in step 504 and determines the preset state of the RS in relation to the R-state RS based on the simultaneous transmission RS set information in step 506.

In step 508, the RS determines whether it is in state R. If the RS is in state R, it receives the data from the BS in step 510.

If the RS is not in state R in step 508, it determines whether it is preset to state T in step 512. If the RS is preset to state T, it determines whether there is buffered transmission data in step 514. In the presence of transmission data, the RS transmits the buffered transmission data in state s in step 516 and then ends the algorithm of the present invention.

In the absence of transmission data in step 514, the RS transitions to state s in step 518 and ends the algorithm of the present invention.

On the other hand, if the RS is preset to state S in step 512, it determines whether transmission data exists and actual simultaneous transmission without interference is available in step 520. Step 520 will be detailed later with reference to FIG. 6.

In the absence of transmission data or if the actual simultaneous transmission without interference is not available, the RS maintains state S as state s in step 522 and then ends the algorithm.

On the contrary, if the RS has transmission data and is capable of actual simultaneous transmission, it transitions from state S to state t and actually transmits data in step 524. Then the RS ends the algorithm of the present invention.

Figure 6:
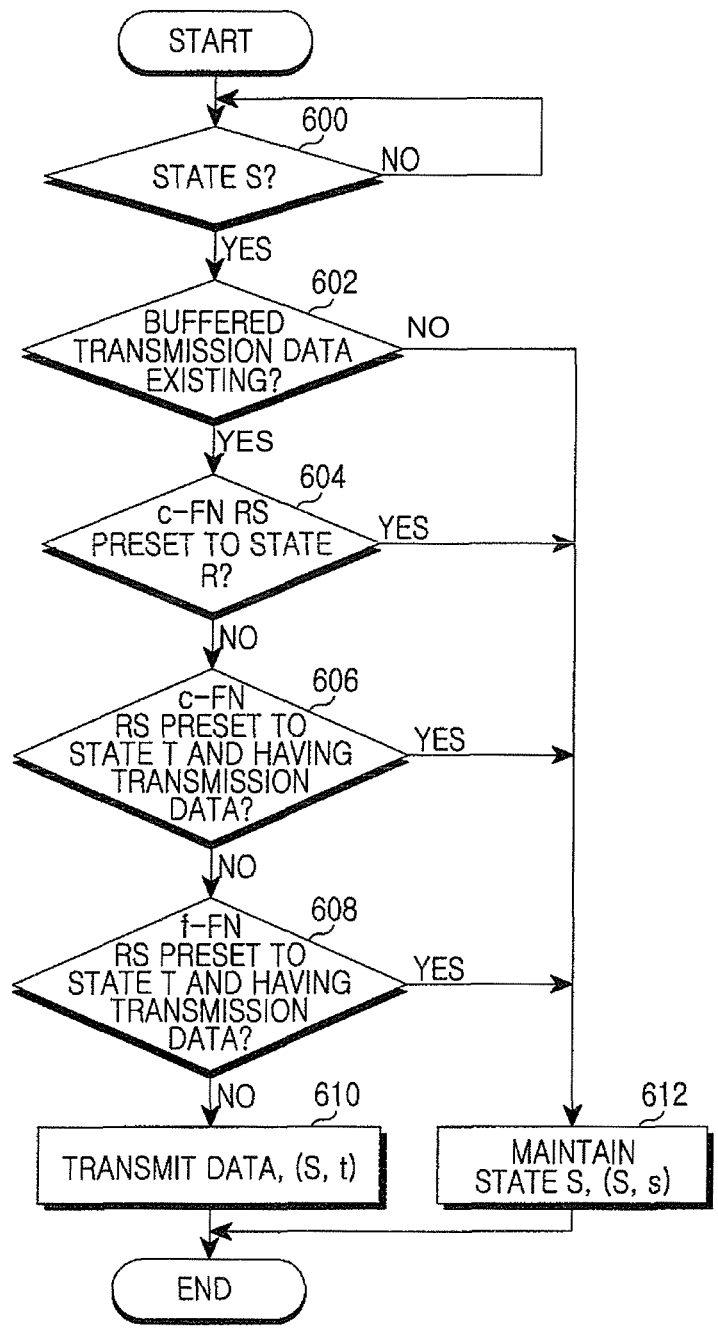
FIG. 6 is a flowchart illustrating a simultaneous transmission scheduling operation of the RS when the RS is preset to a shut-down state in the multi-hop cellular system according to an exemplary embodiment of the present invention.

FIG. 6 is a flowchart illustrating a simultaneous transmission scheduling operation of the RS when the RS is preset to state s in the multi-hop cellular system according to an exemplary embodiment of the present invention.

Referring to FIG. 6, when determining that the RS is preset to state S in step 600, the RS determines whether it has buffered transmission data in step 602. In the absence of transmission data, the RS maintains state S as state s in step 612 and ends the algorithm of the present invention.

In the presence of transmission data, the RS determines whether there is a c-FN RS set to state R in step 604. In the presence of a c-FN RS set to state R, the RS maintains state S as state s in step 612 and ends the algorithm of the present invention.

The determination as to whether there is a c-FN RS set to state R can be made by comparing information about a state-R RS included in a data frame received from the BS with a c-FN RS list preset at an early state of communications. That is, if the state-R RS is included in the c-FN RS list, the RS determines that there is a state-R c-FN RS.

On the other hand, in the absence of a state-R c-FN RS, the RS determines whether a state-T c-FN RS having transmission data in step 606. In the presence of a state-T c-FN RS having transmission data, the RS maintains state S as state s in step 612 and ends the algorithm of the present invention.

To make the determination as to whether there is a state-T c-FN RS having transmission data, the RS first determines whether a state-T c-FN RS exists by detecting state-T relay stations using information about a state-R RS included in a data frame received from the BS and preset simultaneous transmission RS set information and comparing the state-T relay stations with the stored c-FN RS list. Then the RS determines whether there is a state-T c-FN RS having transmission data by detecting the presence or absence of transmission data in state-T c-FN relay stations because the c-FN relay stations are within the cell area of the RS and thus the RS can find out the transmission/reception data states of the c-FN relay stations. That is, the RS can determine whether the state-T c-FN relay stations are in state s due to the absence of transmission data although they are preset to state T.

In the absence of a state-T c-FN RS having transmission data in step 606, the RS determines whether a state-T f-NH RS having transmission data exists in step 608. In the presence of a state-T f-NH RS having transmission data, the RS maintains state S as state s in step 612 and ends the algorithm of the present invention.

To make the determination as to whether there is a state-T f-FN RS having transmission data, the RS first determines whether a state-T f-FN RS exists by detecting state-T relay stations using information about a state-R RS included in a data frame received from the BS and the simultaneous transmission RS set information and comparing the state-T relay stations with a stored f-FN RS list. Although the RS then should determine whether state-T f-FN relay stations have transmission data, this determination cannot be made accurately. Hence, the RS stores information about changes in the preset states of the state-T f-NH relay stations during receiving a predetermined number of data frames and determines based on this information whether the state-T f-NH relay stations have transmission data. Specifically, let state R of an f-NH RS be represented by −1 and state T of the f-NH RS be represented by +1. For the predetermined number of received data frames, the sum of −1 s and +1 s is computed. If the sum is a positive value, the RS determines that the f-NH RS has transmission data. If the sum is a negative value, the RS determines that the f-NH RS does not have transmission data.

In the absence of a state-T f-NH RS in step 608, the RS transitions from state S to state t and transmits the buffered transmission data in step 610 and then ends the algorithm.

Figure 7:
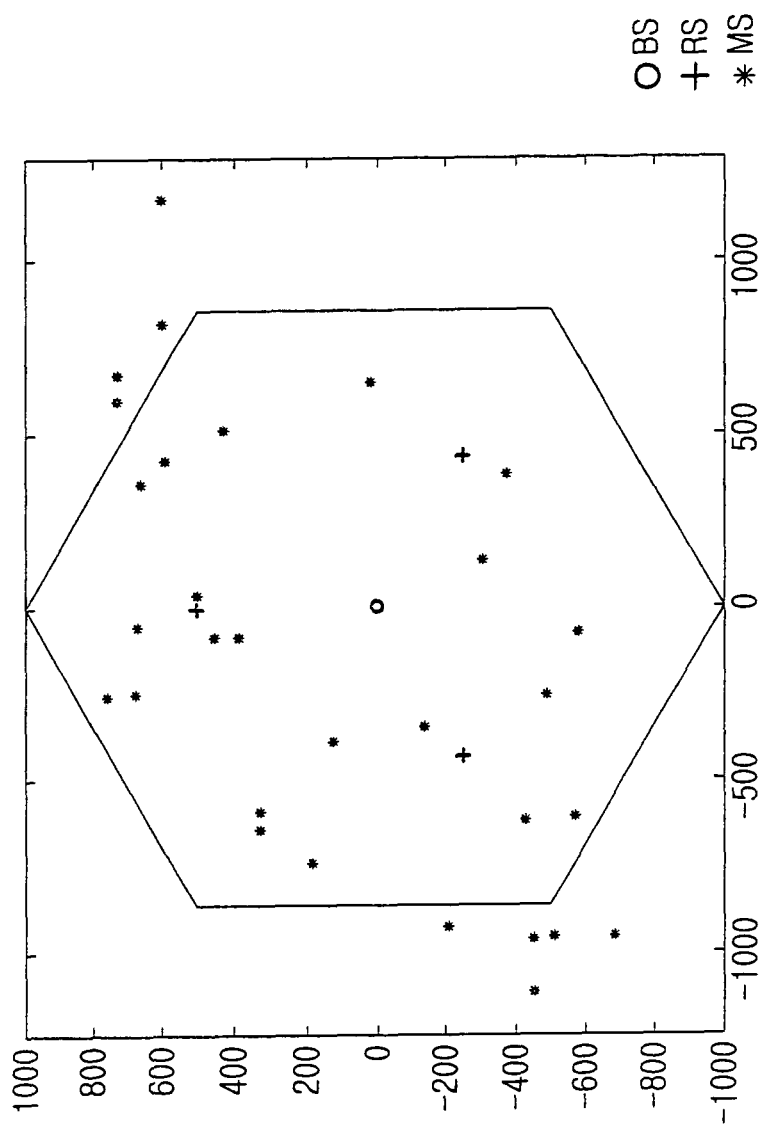
FIG. 7 is a diagram illustrating a position distribution of a BS, relay stations and mobile stations as an environment under which the performance of the multi-hop cellular system according to the exemplary embodiment of the present invention is evaluated.
Figure 8:
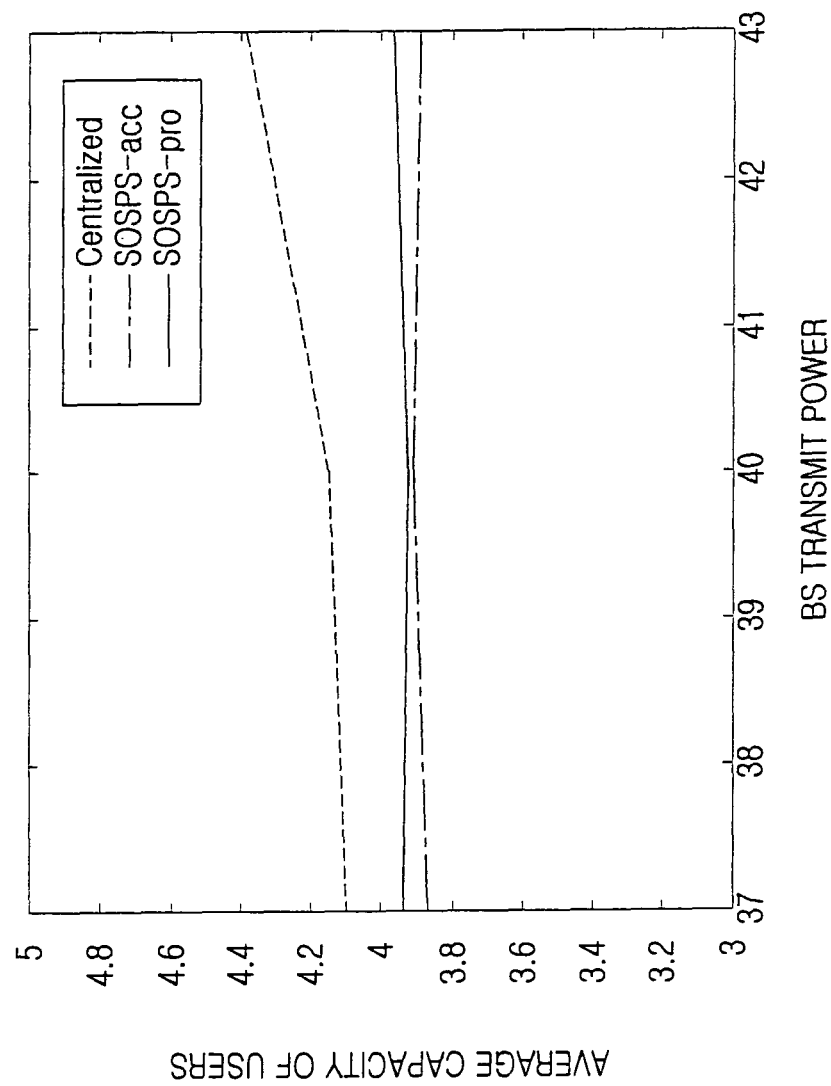
FIG. 8 is a graph comparing the centralized scheduling scheme with the simultaneous transmission scheduling scheme according to the exemplary embodiment of the present invention, in terms of performance.

With reference to FIGS. 7 and 8, the centralized scheduling scheme will be compared with the simultaneous transmission scheduling scheme of the present invention. A BS, relay stations, and mobile stations are distributed as illustrated in FIG. 7.

FIG. 7 is a diagram illustrating a position distribution of a BS, relay stations and mobile stations as an environment under which the performance of the multi-hop cellular system according to the exemplary embodiment of the present invention is evaluated.

Referring to FIG. 7, the simulation environment is that three relay stations exist in a hexagonal cell. The relay stations are away from the BS by half the cell radius. In the cell, 30 mobile stations are randomly distributed and move at a constant rate of 3 Km/h.

The simulation was performed under the conditions that the channel experiences path loss and log-normal slow fading, the attenuation coefficient ($\alpha$) of a signal over distance is 4, the standard deviation of the log-normal fading is 8 dB, and the transmit signal strength constraints of the BS and the relay stations are 4-dB and 37 dB, respectively. Since the relay stations are added, four types of channels are generated, BS-RS channels, BS-MS channels, RS-RS channels, and RS-MS channels, the SINRs of which are computed.

Capacity is computed by the following Shannon capacity formula:

$$C=\log_2(1+\text{SINR}),\qquad\text{[Eqn. 1]}$$

where C denotes the capacity of a link and SINR denotes the signal-to-interference and noise ratio of the link.

The SINR of a BS-RS link should be computed taking into account interference from other relay stations as well as a signal from the BS, and the SINR of an RS-MS link should also be computed taking into account interference from other relay stations and the BS as well as a signal from the RS.

Throughput is defined as the sum of the average capacities per slot of mobile stations when the mobile stations receive data via relay stations. Data transmitted via a BS-RS link and data transmitted via an RS-MS link are not redundantly involved in the throughput computation, and an RS can transmit data to an MS only when its RS buffer has data for the MS. Notably, mobile stations connected directly to the BS are excluded from scheduling in the simulation.

Under the above simulation environment illustrated in FIG. 7, the conventional centralized scheduling scheme (Centralized) is compared with the simultaneous transmission scheduling scheme (Self-Organized Spatial Reuse Scheduling (SOSRS)-pro) in FIG. 8. When the states of buffers in neighbor relay stations are accurately estimated, the simultaneous transmission scheduling scheme is represented as SOSRS-acc. In accordance with the present invention, the buffer states of c-NH relay stations can be accurately estimated but those of f-NH relay stations are roughly estimated. SOSRS-acc is a comparative scheme by which to find out the effects of wrong estimation of the buffer states of f-NH relay stations in SOSRS-pro.

FIG. 8 is a graph comparing the centralized scheduling scheme with the simultaneous transmission scheduling schemes according to the exemplary embodiment of the present invention, in terms of performance.

Referring to FIG. 8, Centralized, SOSRS-acc, and SOSRS-pro are compared in terms of throughput versus BS transmit power. The comparison is made by changing the BS transmit power from 37 dB through 40 dB to 43 dB sequentially, while fixing the RS transmit power to 37 dB. Increasing the BS transmit power results in both positive and negative effects on throughput. Since the increase of BS transmit power in turn increases BS-RS link capacity, the throughput is increased. However, the resulting increase in interference caused to an RS-MS link may leads to a decreased capacity of the RS-MS link.

Relative to a SOSRS-pro throughput of 1 as a reference value, the throughputs of the three schemes are listed below in Table 1.

TABLE 1

|  | 37 dB | 40 dB | 43 dB |
|---|---|---|---|
| Centralized (relative value to pro = 1) | 1.0412 | 1.0574 | 1.1071 |
| SOSRS -acc (relative value to pro = 1) | 0.9817 | 0.9951 | 0.9812 |
| SOSRS -pro | 3.9345 | 3.9247 | 3.9633 |

The comparison among Centralized, SOSRS-acc, and SOSRS-pro in FIG. 8 and Table 1 reveals the following results.

(1) As the BS transmit power increases, SOSRS-pro does not change much in throughput, whereas Centralized has throughput gains of 4%, 5%, and 10% relative to SOSRS-pro. The cause can be that the BS-RS link capacity increase resulting from the BS transmit power increase is counterbalanced by an increased interference in SOSRS-pro, while interference is controlled by avoiding a simultaneous transmission RS set having severe interference in Centralized.

(2) From the fact that SOSRS-pro does not demonstrate much change in throughput with respect to changes in the BS transmit power, it can be expected that control of BS transmit power does not affect BS transmission significantly in SOSRS-pro.

(3) SOSRS-acc has a less throughput than SOSRS-pro despite use of accurate buffer values. The cause can be that even if a pair of f-NH relay stations transmit data simultaneously, collision does not always occur. Since the collision occurs only when a receiving MS is located in a collision area, wrong estimation-based transmission may increase throughput when the MS is located in any other area. The opposite case where an RS does not transmit data based on a wrong estimation that the buffer of a neighbor RS is filled, although it is empty seldom occurs because the BS uses more transmit power and thus the BS-RS link capacity is higher than the RS-MS link capacity on the average. Thus, it can be concluded that the accuracy of the f-NH RS buffer estimation does not affect performance significantly.

As is apparent from the above description, the present invention is intended to provide a simultaneous transmission scheduling and method in a multi-hop cellular system, in which when a BS transmits data to an RS, other relay stations within the service area of the BS operates in states preset in relation to the receiving RS and an RS preset to a shut-down state among these relay stations estimates the states of its neighbor relay stations and transmits data according to the estimated states. Therefore, even though relay stations and mobile stations increase in number within the cell area of the BS, scheduling complexity does not increase much. Furthermore, since relay stations determine their states on their own, the load of the BS is reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A multi-hop cellular system for simultaneous transmission scheduling, comprising:
a base station configured to preset simultaneous transmission relay station set information and transmit the simultaneous transmission relay station set information to relay stations managed by the base station, wherein simultaneous transmission relay station set information includes information about the relay stations managed by the base station that are in a preset receive state; and
a relay station configured to receive the simultaneous transmission relay station set information from the base station, determine, upon receipt of a data frame from the base station, a preset state of the relay station in relation to an other relay station indicated as a recipient for the data frame by comparing an Identifier (ID) of the other relay station included in the data frame with the simultaneous transmission relay station set information, and operate according to the preset state.

2. The multi-hop cellular system of claim 1, wherein for each of the relay stations managed by the base station, the base station is further configured to detect close-NeighborHood (c-FN) relay stations and far-NeighborHood (f-FN) relay stations, and for each relay station preset to a receive state, the base station is further configured to preset c-FN relay stations of the relay stations to a shut-down state and preset f-FN relay stations of the relay stations to a transmit state, and for each relay station preset to a transmit state, preset c-FN relay stations and f-NH relay stations of the relay stations to the shut-down state in the simultaneous transmission relay station set information.

3. The multi-hop cellular system of claim 1, wherein when the relay station is preset to a shut-down state, the relay station is further configured to determine whether transmission data exists and data transmission will cause interference to a neighbor relay station, and transition to an actual transmit state and transmit the data when the transmission data exists and the data transmission will not cause interference to a neighbor relay station.

4. The multi-hop cellular system of claim 3, wherein when the relay station is preset to the shut-down state, the relay station does not have a c-FN relay station preset to the receive state, and the relay station has neither a c-FN relay station preset to the transmit state and having transmission data nor an f-FN relay station preset to the transmit state and having transmission data, the relay station is further configured to determine that the data transmission will not cause interference.

5. The multi-hop cellular system of claim 4, wherein the relay station is further configured to determine whether c-FN relay stations preset to the transmit state have transmission data by overhearing data transmitted to and from the c-FN relay stations preset to the transmit state.

6. The multi-hop cellular system of claim 4, wherein the relay station is further configured to store information about changes in the preset state of an f-FN relay station preset to the transmit state and, when the information indicates that the f-FN relay station preset to the transmit state has a larger number of preset receive states than preset transmit states, determine that the f-FN relay station preset to the transmit state has transmission data.

7. A relay station in a multi-hop cellular system that performs simultaneous transmission scheduling, comprising:
a communication module configured to receive a data frame from a base station; a memory configured to store preset simultaneous transmission relay station set information and preset neighbor relay station information, wherein the preset simultaneous transmission relay station set information includes information about relay stations in the multi-hop cellular system that are in a preset receive state; and
a scheduler configured to, upon receipt of a data frame from the base station, determine a preset state of the relay station in relation to an other relay station indicated as a recipient for the data frame by comparing an Identifier (ID) of the other relay station included in the data frame with the preset simultaneous transmission relay station set information, and control the relay station to operate according to the preset state.

8. The relay station of claim 7, wherein the neighbor relay station information includes information about close-NeighborHood (c-FN) relay stations being relay stations within a cell area of the relay station and information about far-NeighborHood (f-FN) relay stations which are not within the cell area of the relay station and have cell areas overlapped with the cell area of the relay station.

9. The relay station of claim 8 further comprising:
a simultaneous transmission decider configured to determine whether simultaneous transmission is possible by determining whether data transmission interferes with a neighbor relay station, wherein when the relay station is preset to a shut-down state, the scheduler is further configured to determine whether the simultaneous transmission is possible through the simultaneous transmission decider and, when the simultaneous transmission is possible, change a state of the relay station from the preset shut-down state to an actual transmission state and control data to be transmitted.

10. The relay station of claim 7, wherein:
the neighbor relay station information includes information about close-NeighborHood (c-FN) relay stations and information about far-NeighborHood (f-FN) relay stations; and
when the relay station is preset to the shut-down state, the relay station does not have a c-FN relay station preset to a receive state, and the relay station has neither a c-FN relay station preset to the transmit state and having transmission data nor an f-FN relay station preset to the transmit state and having transmission data, the simultaneous transmission decider is further configured to determine that the data transmission will not cause interference.

11. The relay station of claim 10 further comprising:
a state writer configured to overhear data transmitted to and from a c-FN relay station preset to the transmit state and storing information about the amounts of the transmission data and the received data of the c-FN relay station, wherein the simultaneous transmission decider is further configured to determine whether the c-FN relay station preset to the transmit state has transmission data based on the stored information.

12. The relay station of claim 11, wherein the state writer is further configured to store information about changes in the preset state of an f-FN relay station preset to the transmit state, wherein when the stored information indicates that the f-FN relay station preset to the transmit state has a larger number of preset receive states than preset transmit states, the simultaneous transmission decider is further configured to determine that the f-FN relay station preset to the transmit state has transmission data.

13. A simultaneous transmission scheduling method of a relay station in a multi-hop cellular system, comprising:
storing preset simultaneous transmission relay station set information indicating sets of relay stations capable of simultaneous transmission;
detecting, upon receipt of a data frame from a base station, information about an other relay station indicated as a recipient for the data frame;
determining a preset state of the relay station in relation to the other relay station by comparing the information about the other relay station with the simultaneous transmission relay station set information; and
operating according to the preset state.

14. The simultaneous transmission scheduling method of claim 13, further comprising receiving data from the base station, when the relay station is preset to a receive state.

15. The simultaneous transmission scheduling method of claim 13, when the relay station is preset to a transmit state, further comprising:
determining whether transmission data is buffered in a buffer; and
transmitting the transmission data in the presence of the transmission data in the buffer.

16. The simultaneous transmission scheduling method of claim 13, when the relay station is preset to a shut-down state, further comprising:
determining whether transmission data exists and data transmission will cause interference to a neighbor relay station; and
transitioning to an actual transmit state and transmitting the data when the transmission data exists and the data transmission will not cause interference to a neighbor relay station.

17. The simultaneous transmission scheduling method of claim 13, further comprising:
when the relay station is preset to a shut-down state, determining whether transmission data exists and data transmission will cause interference to a neighbor relay station, wherein determining whether data transmission will cause interference to a neighbor relay station comprises:
determining that the data transmission will not cause interference, when the relay station does not have a c-FN relay station preset to the receive state, and the relay station has neither a c-FN relay station preset to the transmit state and having transmission data nor an f-FN relay station preset to the transmit state and having transmission data.

18. The simultaneous transmission scheduling method of claim 17, wherein it is determined whether a c-FN relay station preset to the transmit state has transmission data by overhearing data transmitted to and from the c-FN relay station preset to the transmit state.

19. The simultaneous transmission scheduling method of claim 17, wherein it is determined whether an f-FN relay station preset to the transmit state has transmission data by storing information about changes in the preset state of the f-FN relay station preset to the transmit state and, when the information indicates that the f-FN relay station preset to the transmit state has a larger number of preset receive states than preset transmit states, it is determined that the f-FN relay station preset to the transmit state has transmission data.

20. The simultaneous transmission scheduling method of claim 13 further comprising:
identifying a preset state of the other relay station from the data frame; and
determining whether the relay station can transmit data without interference to the other relay station based on the state of the other relay station and information about a location of the other relay station relative to the relay station, the location identified from the preset simultaneous transmission relay station set information.

* * * * *